(12) United States Patent
Kamijo et al.

(10) Patent No.: US 10,051,448 B2
(45) Date of Patent: Aug. 14, 2018

(54) WIRELESS COMMUNICATION DEVICE AND PROCESSOR FOR CHANGING CONNECTION INTERVAL BETWEEN DEVICES IN SHORT RANGE WIRELESS COMMUNICATION

(71) Applicant: KYOCERA Corporation, Kyoto-shi, Kyoto (JP)

(72) Inventors: Tomoya Kamijo, Yokohama (JP); Masashi Fujisawa, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 15/280,950

(22) Filed: Sep. 29, 2016

(65) Prior Publication Data

US 2017/0094452 A1  Mar. 30, 2017

(30) Foreign Application Priority Data

Sep. 30, 2015  (JP) ................................. 2015-193998

(51) Int. Cl.
*H04W 4/80* (2018.01)
*H04W 72/08* (2009.01)
(Continued)

(52) U.S. Cl.
CPC ............ *H04W 4/80* (2018.02); *H04W 4/008* (2013.01); *H04W 72/0446* (2013.01); *H04W 72/085* (2013.01)

(58) Field of Classification Search
CPC ........... H04W 4/20; H04W 4/23; H04W 4/30; H04W 4/08; H04W 52/02;
(Continued)

(56) References Cited

U.S. PATENT DOCUMENTS

2015/0163846 A1* 6/2015 Weizman ............ H04W 76/043
455/41.2
2015/0172906 A1* 6/2015 Terazaki ............... H04W 76/10
455/434

FOREIGN PATENT DOCUMENTS

| JP | 9-135201 A | 5/1997 |
| JP | 2003-134029 A | 5/2003 |
| JP | 2005-236362 A | 9/2005 |

OTHER PUBLICATIONS

Office Action in JP Application No. 2015-193998, dated Aug. 22, 2017, 5pp.

(Continued)

*Primary Examiner* — Blane Jackson
(74) *Attorney, Agent, or Firm* — Hauptman Ham, LLP

(57) ABSTRACT

A wireless communication device includes a communication module configured to transmit data to another wireless communication device using a short range wireless communication protocol, and a controller configured to make the communication module transmit data to the other wireless communication device at predetermined intervals, when the data to be transmitted to the other wireless communication device is generated, in a connection state with the other wireless communication device using the short range wireless communication protocol. The controller performs a process for changing the predetermined interval in accordance with presence or absence of the generation of the data to be transmitted.

17 Claims, 6 Drawing Sheets

(51) Int. Cl.
*H04W 72/04* (2009.01)
*H04W 4/00* (2018.01)

(58) Field of Classification Search
CPC . H04W 52/0209; H04W 52/06; H04W 52/09; H04W 72/04; H04W 72/0446; H04W 72/08; H04W 72/085; H04W 4/008
See application file for complete search history.

(56) References Cited

OTHER PUBLICATIONS

Office Action in JP Application No. 2015-193998 dated Mar. 14, 2017.
Bluetooth Specification Version 4.0, Jun. 30, 2010, for which saved in 2 files.

* cited by examiner

FIG.7

| RSSI | CONNECTION LATENCY |
|---|---|
| HIGH (-30 TO -40) | 0 |
| MIDDLE (-41 TO -50) | 2 |
| LOW (-51 TO -60) | 4 |

WIRELESS COMMUNICATION DEVICE AND PROCESSOR FOR CHANGING CONNECTION INTERVAL BETWEEN DEVICES IN SHORT RANGE WIRELESS COMMUNICATION

CROSS-REFERENCE TO RELATED APPLICATION(S)

The present application claims priority to and incorporates by reference the entire contents of Japanese Patent Application No. 2015-193998 filed in Japan on Sep. 30, 2015

BACKGROUND OF THE INVENTION

1. Field of the Invention

The present invention relates to a wireless communication device and a processor that perform short range wireless communication.

2. Description of the Related Art

Bluetooth (registered trademark) has been conventionally known as a technology for short range wireless communication among a plurality of wireless communication devices. As extended specifications of the Bluetooth to realize short range wireless communication with lower power consumption than before, Bluetooth Low Energy (BLE) has been defined in the Bluetooth specification (refer to non-patent document 1).

BLE-compatible wireless communication devices perform, after a BLE connection process, short range wireless communication with each other using a BLE protocol at connection intervals set in each device. To be more specific, when the wireless communication devices are connected with each other using the BLE protocol, upon the generation of transmission data in one of the wireless communication devices (master or slave), the one of the wireless communication devices transmits the transmission data (in whole or in part) to the other wireless communication device at the connection intervals set in each device. On the other hand, when no transmission data is generated in any of the wireless communication devices (neither master nor slave), at least any one of the wireless communication devices (master or slave) transmits empty packets to the other wireless communication device (slave or master) at the connection intervals set in each device to maintain the BLE connection state with each other. The BLE-compatible wireless communication devices set a connection latency (sequential non-communication allowable number), as well as the connection interval, in the BLE connection process. The connection latency (sequential non-communication allowable number) indicates the number of communications in which a BLE connection state is maintained, even if one of the wireless communication devices (master) sequentially fails to receive data or empty packets transmitted from the other wireless communication device (slave). To be more specific, the one of the wireless communication devices (master) maintains the BLE connection state, even if the one of the wireless communication devices (master) sequentially fails to receive the data or empty packets transmitted from the other wireless communication device (slave) by the sequential non-communication allowable number of times.

As a procedure for changing parameters such as a connection interval and a sequential non-communication allowable number set in each of the wireless communication devices (master and slave) during the BLE connection process and the like, one of the wireless communication devices (master) transmits an update request including information about a connection interval and/or a sequential non-communication allowable number after the change to the other wireless communication device (slave), and the other wireless communication device (slave) transmits a response to the one of the wireless communication devices (master). The information about the connection interval after the change is the value of the changed connection interval, or the like. The information about the sequential non-communication allowable number after the change is the value of the changed sequential non-communication allowable number, or the like.

The update request that the one of the wireless communication devices (master) transmits includes an instant i.e. information about the number of the connection intervals required to elapse between the setting of the new connection interval (the change of the connection interval) and the start of transmitting data (empty packets) at the new connection intervals. The wireless communication devices (master and slave) each perform the above-described procedure for changing the connection interval, wait for a lapse of the connection intervals the number of which is indicated by the instant, and subsequently start transmitting data (empty packets) at the new connection intervals.

PRIOR ART DOCUMENTS

Non-patent document: BLUETOOTH SPECIFICATION Version 4.0

However, the connection interval set in each of the wireless communication devices (master and slave) is only set during the BLE connection process or changed during a sleep mode of an OS.

SUMMARY OF THE INVENTION

It is an object of the present invention to at least partially solve the problems in the conventional technology.

A wireless communication device according to one aspect includes:

a communication module configured to transmit data to another wireless communication device using a short range wireless communication protocol; and a controller configured to make the communication module transmit data to the other wireless communication device at predetermined intervals, when the data to be transmitted to the other wireless communication device is generated, in a connection state with the other wireless communication device using the short range wireless communication protocol, wherein the controller performs a process for changing the predetermined interval in accordance with presence or absence of the generation of the data to be transmitted.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 7 is a drawing of a table representing a correspondence between an RSSI and the sequential non-communication allowable number (connection latency) in the wireless terminal 100 (100a) according to the second embodiment of the present invention.

DETAILED DESCRIPTION OF THE PREFERRED EMBODIMENTS

Figure 1:
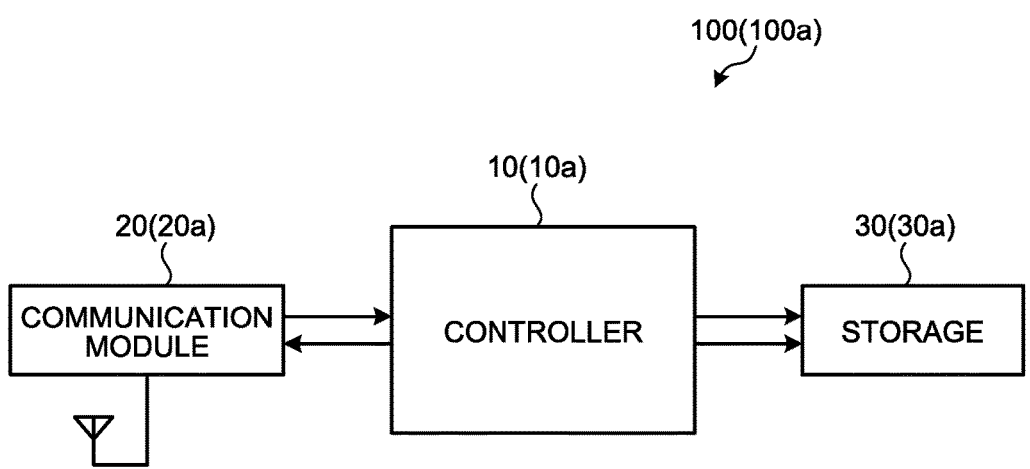
FIG. 1 is a block diagram of a wireless terminal 100 (100a) according to embodiments of the present invention.

FIG. 1 is a block diagram that illustrates the functions of a wireless terminal 100 (100a) according to embodiments of the present invention.

The wireless terminal 100 includes at least a controller 10, a communication module 20, and a storage 30. The wireless terminal 100 may further include, for example, any of a display, an operation part, a camera, various sensors, an interface, a microphone, a speaker, and the like.

The controller 10 controls each of the components (communication module 20 and storage 30) of the wireless terminal 100. For example, the controller 10 inputs a signal to the communication module 20, and, in response to the signal input from the controller 10, the communication module 20 transmits or receives data through an antenna. To perform predetermined processes, the controller 10 reads various programs and data from the storage 30, writes data into the storage 30, and the like. The controller 10 may be constituted by at least one CPU or a chipset.

The communication module 20 performs short range wireless communication with another wireless communication device using a predetermined frequency band (for example, 2.4 GHz). The communication module 20 performs short range wireless communication using a short range wireless communication protocol e.g. a Bluetooth Low Energy (Bluetooth 4.0, BLE) protocol. The communication module 20 demodulates a signal received via the antenna, and outputs the demodulated signal to the controller 10. The communication module 20 also modulates a signal input from the controller 10, and transmits the modulated signal to another wireless communication device via the antenna.

The storage 30 includes, for example, a working memory, and is used for arithmetic processes by the controller 10. The storage 30 stores various programs related to the embodiments. The storage 30 stores a timer for defining a time for which the generation of transmission data is monitored. The storage 30 stores attribute information. The attribute information, which is information used for communication between the wireless terminal 100 and a wireless terminal 100a using the BLE protocol, includes profile information, a device ID, a device name, and the like. The storage 30 stores connection interval values (1 second, 50 milliseconds, or the like), and may store the connection interval values so as to be associated with HIGH or LOW. The storage 30 stores an instant, that is, information about the number of connection intervals required to elapse between a change of a connection interval value and an actual application of a changed connection interval value. The storage 30 also stores the maximum amount (maximum packet count) of data transmittable in each connection interval. The storage 30 also stores a list (refer to FIG. 7) that represents a correspondence between the category of the value of an RSSI (the range of the value of the RSSI) and a sequential non-communication allowable number. In the list, by way of example, the higher the value of the RSSI (with a change in the category from low to middle to high), the lower value (from 4 to 2 to 0) of the sequential non-communication allowable number is associated.

The wireless terminal 100a include at least a controller 10a, a communication module 20a, and a storage 30a. The controller 10a, the communication module 20a, and the storage 30a have the same configurations at least in part as the controller 10, the communication module 20, and the storage 30 of the wireless terminal 100, respectively.

Then, a procedure for connection and communication between the wireless terminals 100 and 100a according to the embodiments of the present invention will be described with reference to FIG. 2.

First of all, upon powering on the wireless terminal 100a (slave), booting an application associated with the short range wireless communication, or the like, the wireless terminal 100a (slave) transmits (broadcasts) advertising (advertising packets) to a wireless terminal nearby using a broadcasting channel in order to inform the wireless terminal nearby of the presence of the wireless terminal itself (Step S1).

Subsequently, upon powering on the wireless terminal 100 (master), booting an application associated with the short range wireless communication, or the like, the wireless terminal 100 (master) starts retrieving (scanning) the advertising transmitted using the broadcasting channel. The wireless terminal 100 receives the advertising transmitted from the wireless terminal 100a. When it is determined that the wireless terminal 100a is a wireless terminal to be connected, the wireless terminal 100 transmits a connection request for short range wireless communication to the wireless terminal 100a in order to establish a short range wireless communication connection with the wireless terminal 100a (Step S2).

By performing Steps S1 and S2, the wireless terminal 100 and the wireless terminal 100a become in a connection state with each other (Step S3). A connection interval included in the connection request is set in the wireless terminal 100 and the wireless terminal 100a, and thereafter the wireless terminal 100 and the wireless terminal 100a transmit data (or empty packets) to and receive data (or empty packets) from each other at the connection intervals.

The wireless terminal 100 and the wireless terminal 100a that are in the connection state (BLE connection state) with each other, first of all, exchange the attribute information with each other (Step S4). The attribute information is information used for communication using the BLE protocol between the wireless terminal 100 and the wireless terminal 100a, and includes the profile information, the device ID, the device name, and the like.

After that, when transmission data to be transmitted to the wireless terminal 100 is generated in the wireless terminal 100a (Step S5), the wireless terminal 100a transmits the data after a lapse of the connection interval from S4 (Step S6). The generation timing of the transmission data is not limited to Step S5, but may be before Step S5.

Since the data amount (packet count) transmittable in each connection interval is limited, when the entire transmission data generated at Step S5 is not completely transmitted at Step S6, the wireless terminal 100a transmits remaining data of the data generated at Step S5 on the next occasion after a lapse of the connection interval (Step S7). The entire transmission data generated at Step S5 is completely transmitted at Step S7, so that the wireless terminal 100a becomes in a state of having no transmission data (Step S8).

Since there is no transmission data, the wireless terminal 100a transmits an empty packet, instead of data, to the wireless terminal 100 on the next occasion to Step S7 after a lapse of the connection interval (Step S9). Thus, the wireless terminal 100a remains in the connection state with the wireless terminal 100.

Steps S5 to S9 are performed in accordance with the generation of transmission data in the wireless terminal 100a, in the connection state between the wireless terminal 100 and the wireless terminal 100a. Just as with the wireless terminal 100a, the wireless terminal 100 performs Steps S6 to S9 with the wireless terminal 100a at the connection intervals, depending on the presence or absence of the generation of transmission data.

Then, a procedure for changing the connection interval of the wireless terminals 100 and 100a according to the embodiments of the present invention will be described with reference to FIG. 3.

Figure 2:
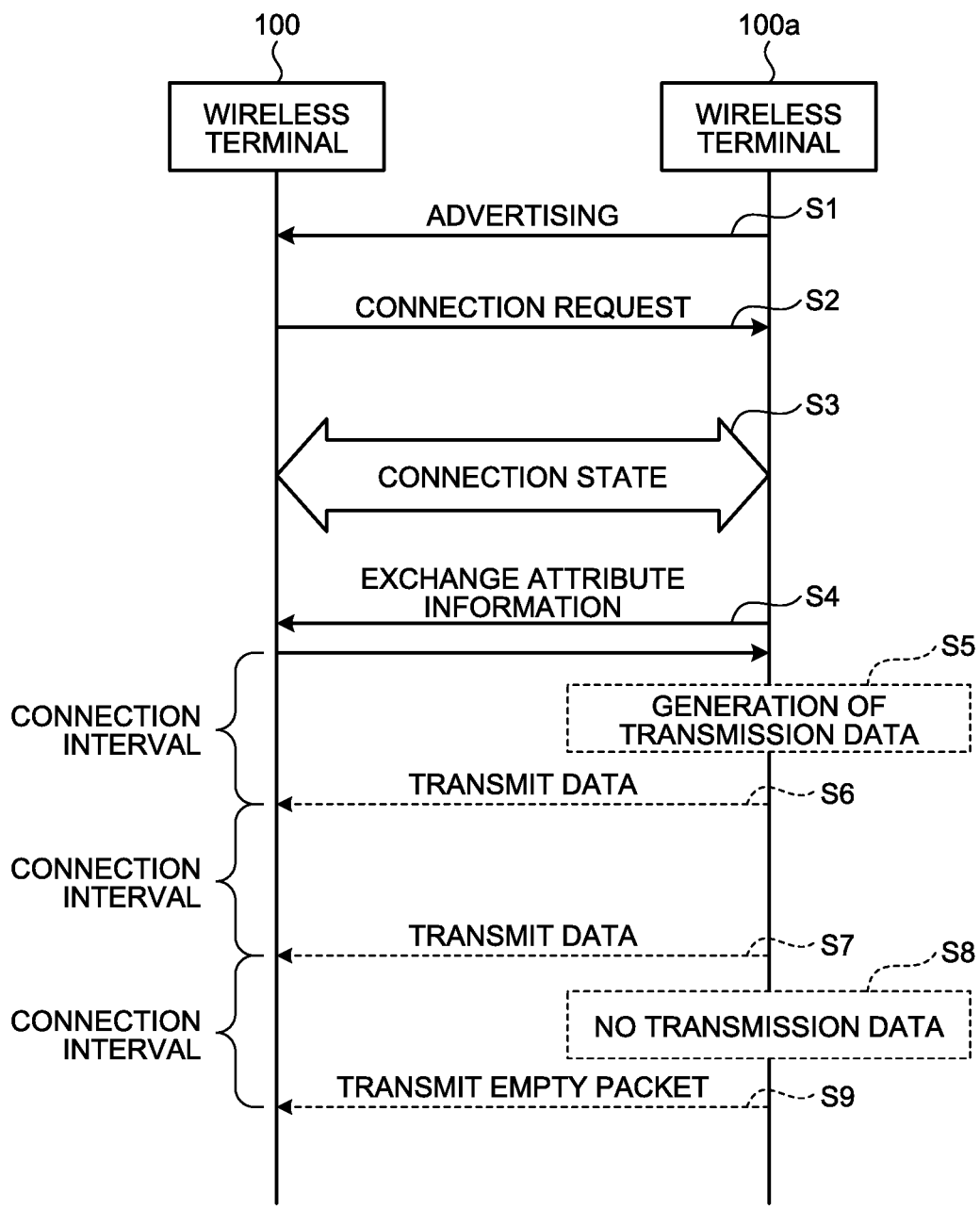
FIG. 2 is a drawing that illustrates a procedure for connection and communication between the wireless terminals 100 and 100a according to the embodiments of the present invention.

While maintaining the connection state (BLE connection state) between the wireless terminal 100a (slave) and the wireless terminal 100 (master) at Step S3 of FIG. 2, when the wireless terminal 100a has determined to change the connection interval, the wireless terminal 100a transmits a change request, which requests a change of the connection interval, to the wireless terminal 100 as a process for changing the connection interval (Step S11). The wireless terminal 100a makes the change request include information about a connection interval that the wireless terminal 100a requests to change. The information about the connection interval may be a connection interval value (1 second, 50 milliseconds, or the like) after a change, or information indicating whether the connection interval is increased (HIGH) or decreased (LOW) from a current connection interval value.

The change request is transmitted (Step S11), when the wireless terminal 100a has determined to change the connection interval. Irrespective of the reception of the change request, if the wireless terminal 100 determines that the connection interval needs changing, the transmission of the change request from the wireless terminal 100a is not required. A change request is also transmitted (Step S11), when the wireless terminal 100a has determined to change the sequential non-communication allowable number (connection latency). In this case, the change request includes a sequential non-communication allowable number to which the wireless terminal 100a requests to change.

Then, in the case of receiving the change request from the wireless terminal 100a at Step S11, the wireless terminal 100 determines whether or not to accept the change request (or the connection interval included in the change request). In a case where the change request includes the sequential non-communication allowable number, the wireless terminal 100 determines whether or not to accept the sequential non-communication allowable number. When it is determined that the change request (the connection interval and/or the sequential non-communication allowable number included therein) is accepted, the wireless terminal 100 transmits an update request, which includes the information about the connection interval and/or the information about the sequential non-communication allowable number included in the received change request, to the wireless terminal 100a (Step S12). Even if no change request is received from the wireless terminal 100a at Step S11, when the wireless terminal 100 has determined to change the connection interval and/or the sequential non-communication allowable number, the wireless terminal 100 transmits an update request, which includes information about a connection interval and/or information about a sequential non-communication allowable number to be changed, to the wireless terminal 100a. The information about the connection interval may be a connection interval value (1 second, 50 milliseconds, or the like) after a change, or information indicating whether the connection interval is increased (HIGH) or decreased (LOW) from a current connection interval value. The information about the sequential non-communication allowable number includes an instant i.e. information indicating the number of the connection intervals required to elapse between the change of the connection interval and the actual application of the changed connection interval value.

Upon receiving the update request from the wireless terminal 100, the wireless terminal 100a transmits an update response to the wireless terminal 100, as a response to the update request (Step S13). Therefore, the wireless terminals 100 and 100a set the connection interval (updates the connection interval and/or the sequential non-communication allowable number) based on the information about the connection interval included in the update request and/or the information about the sequential non-communication allowable number included in the update request. For example, when the information about the connection interval included in the update request is a connection interval value after a change, the wireless terminals 100 and 100a set the value as the connection interval. When the information about the connection interval included in the update request is information indicating whether the connection interval is increased (HIGH) or decreased (LOW) from a current connection interval value, the wireless terminals 100 and 100a set a connection interval value corresponding to HIGH or LOW stored in advance.

Then, after a lapse of the unchanged connection interval from the transmission of the update response, the wireless terminal 100a transmits data if there is transmission data, or an empty packet if there is no transmission data (Step S14).

Thereafter, the wireless terminal 100a transmits data or empty packets, depending on the presence or absence of transmission data, at the unchanged connection intervals, until the connection intervals the number of which is indicated by the instant included in the update request have elapsed.

When the connection intervals the number of which is indicated by the instant have elapsed after the change of the connection interval, the wireless terminal 100a transmits data to the wireless terminal 100 (Step S15), and thereafter actually applies the changed connection interval. After that, when the changed connection interval has elapsed, the wireless terminal 100a transmits data (or an empty packet) to the wireless terminal 100 (Step S16). Just as with the wireless terminal 100a, the wireless terminal 100 performs Steps S13 to S16 with the wireless terminal 100a.

Then, a determination flow before the execution of a process for changing a connection interval (from LOW to HIGH) by the wireless terminal 100 (100a) according to a first embodiment of the present invention will be described with reference to FIG. 4.

A determination flow before the execution of a process for changing a connection interval (from LOW to HIGH) by the wireless terminal 100 (master) will next be described.

Figure 3:
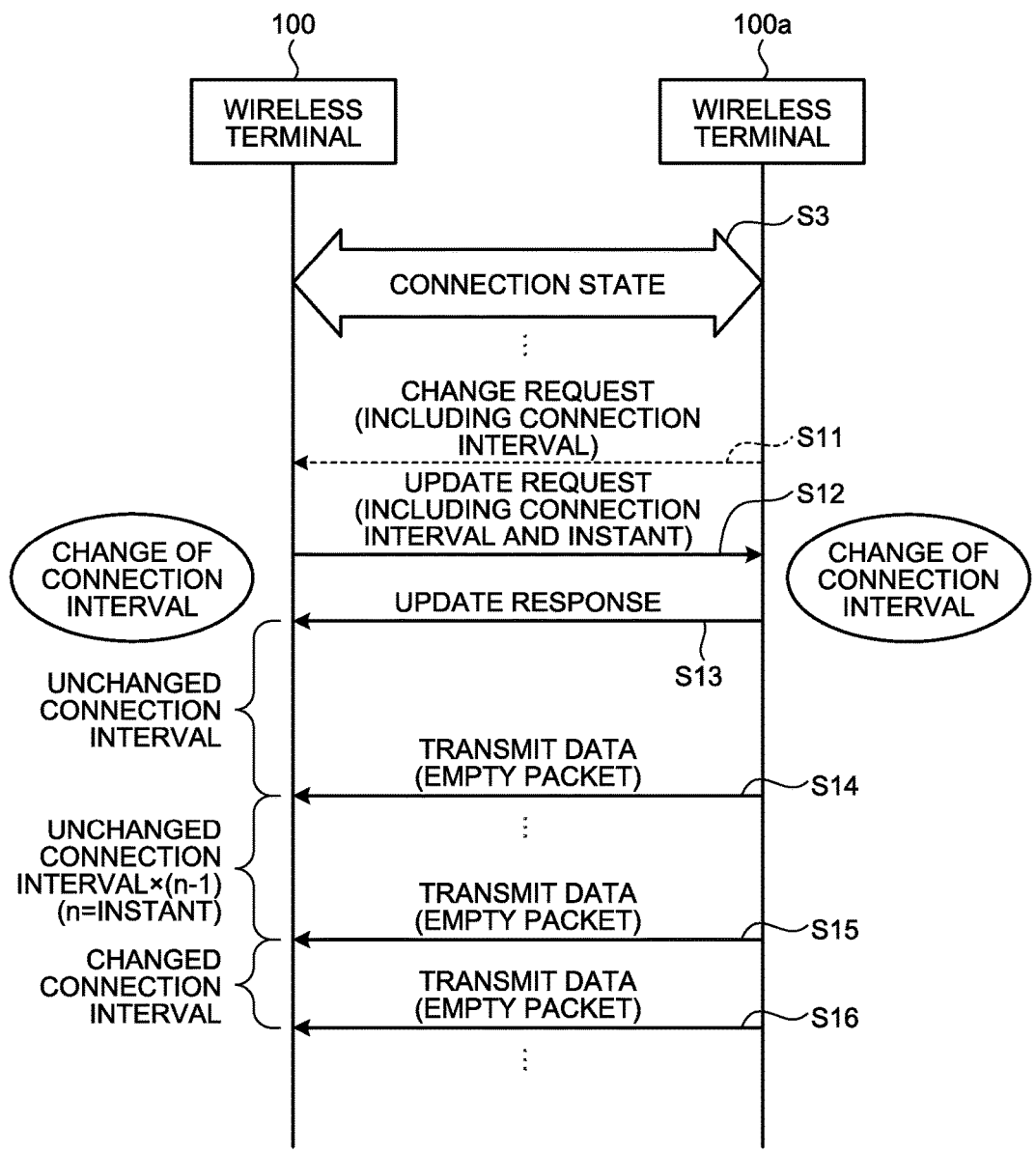
FIG. 3 is a drawing that illustrates a procedure for changing a connection interval of the wireless terminals 100 and 100a according to the embodiments of the present invention.

In the connection state (BLE connection state) in Step S3 of FIG. 2 or 3, the wireless terminal 100 (master) determines whether a currently set connection interval is HIGH or LOW (Step S21). For example, when the currently set connection interval is 1 second (or in units of second), the wireless terminal 100 determines that the connection interval is HIGH. On the other hand, when the currently set connection interval is 50 milliseconds (or in units of millisecond), the wireless terminal 100 determines that the connection interval is LOW.

When it is determined that the connection interval is LOW at Step S21 (LOW at Step S21), the wireless terminal 100 determines whether or not the attribute information has already been exchanged with the wireless terminal 100a (Step S22). When the wireless terminal 100 has the attribute information of the wireless terminal 100a, the wireless terminal 100 may determine that the attribute information has already been exchanged.

A determination flow (FIG. 5) in a case where the wireless terminal 100 has determined that the connection interval is HIGH (HIGH at Step S21) will be described later.

When it is determined that the attribute information has already been exchanged (YES at Step S22), the wireless terminal 100 activates the timer stored in the storage 30 (Step S23).

On the other hand, when it is determined that the attribute information has not been exchanged yet (NO at Step S22), the wireless terminal 100 repeats the determination of Step S22 until the attribute information is exchanged.

Upon activating the timer, the wireless terminal 100 monitors the generation of transmission data (Step S24). The wireless terminal 100 keeps monitoring the generation of transmission data (NO at Step S24 and NO at Step S25) until the timer expires (while the timer progresses).

Upon the generation of transmission data during the progression of the timer (YES in Step S24), the wireless terminal 100 stops the timer (Step S27). The wireless terminal 100 may reset, instead of stop, the timer (may return the timer to its initial value).

After stopping the timer (Step S27), the wireless terminal 100 monitors whether or not a data transmission has been completed (Step S28). When it is determined that the data transmission has been completed (YES at Step S28), the wireless terminal 100 restarts the stopped timer (Step S23). If the timer has been reset, instead of stopped, the wireless terminal 100 starts the timer from the beginning (Step S23).

When it is determined that the started or restarted timer has expired (YES at Step S25), the wireless terminal 100 performs a process for changing the connection interval from LOW (50 milliseconds) to HIGH (1 second) (Step S26). As the process for changing the connection interval, the wireless terminal 100 transmits an update request at Step S12 of FIG. 3. The wireless terminal 100 makes the update request include a connection interval value (1 second), which corresponds to HIGH, after a change, or information indicating an increase in the connection interval from a current connection interval value, as the information about the connection interval to be changed. After that, the changed connection interval (1 second) is set at Steps S12 and S13 of FIG. 3, the wireless terminal 100 determines that the connection interval is HIGH (HIGH at Step S21). A determination flow (FIG. 5) of the wireless terminal 100 after this will be described later.

On the other hand, in a determination flow before the execution of a process for changing a connection interval (from LOW to HIGH) by the wireless terminal 100a (slave), just as in the case of the wireless terminal 100 described above, the wireless terminal 100a determines whether or not to change a connection interval from LOW to HIGH according to Steps S21 to S28. In Step S26, the process for changing the connection interval from LOW to HIGH is different between the wireless terminal 100a and the wireless terminal 100. As the process for changing the connection interval from LOW to HIGH, the wireless terminal 100a transmits a change request to the wireless terminal 100 at Step S11 of FIG. 3. The wireless terminal 100a makes the change request include a connection interval value (1 second), which corresponds to HIGH, after a change, or information indicating that the connection interval is increased from a current connection interval value, as information about a connection interval that the wireless terminal 100a requests to change.

According to the determination process of the wireless terminal 100 (100a) described with reference to FIG. 4, when data communication (transmission data) is generated, the wireless terminal 100 (100a) keeps the connection interval at LOW (50 milliseconds) in order to reduce time required for the data communication. On the other hand, when data communication (transmission data) is not generated for a given length of time or more, the wireless terminal 100 (100a) changes the connection interval to HIGH (1 second) in order to reduce the frequency of transmission of empty packets, thus allowing a reduction in power consumption required for the transmission of the empty packets.

Figure 5:
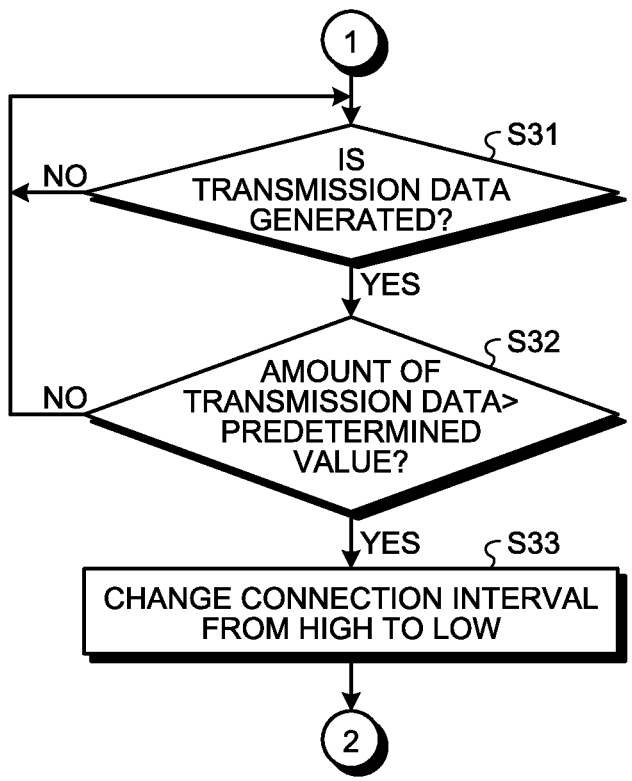
FIG. 5 is a drawing of a determination flow before the execution of a process for changing a connection interval (from HIGH to LOW) by the wireless terminal 100 (100a) according to the first embodiment of the present invention.

Then, a determination flow before the execution of a process for changing a connection interval (from HIGH to LOW) by the wireless terminal 100 (100a) according to the first embodiment of the present invention will be described with reference to FIG. 5.

A determination flow before the execution of a process for changing a connection interval (from HIGH to LOW) by the wireless terminal 100 (master) will next be described.

Figure 4:
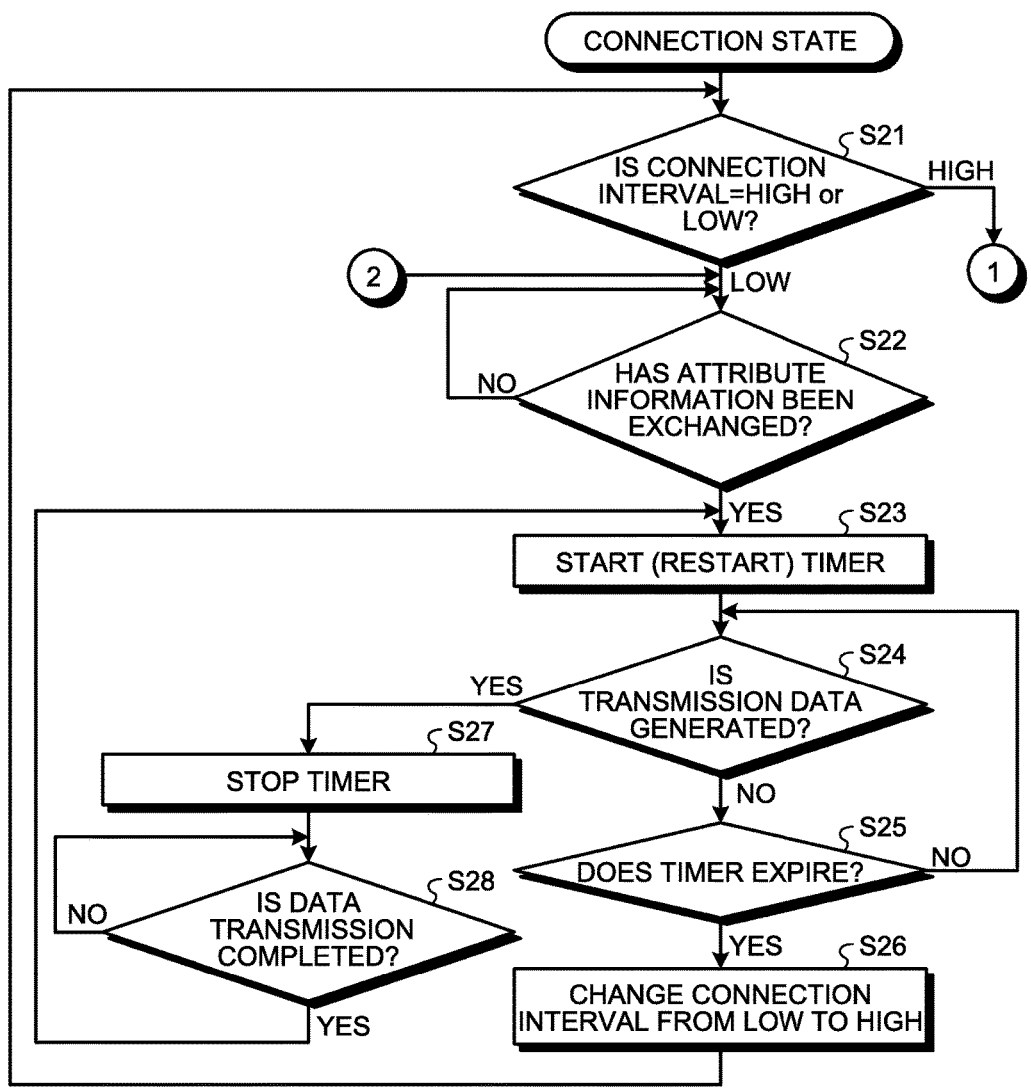
FIG. 4 is a drawing of a determination flow before the execution of a process for changing a connection interval (from LOW to HIGH) by the wireless terminal 100 (100a) according to a first embodiment of the present invention.

When it is determined that the connection interval is HIGH at Step S21 of FIG. 4 (HIGH at Step S21), the wireless terminal 100 monitors the generation of transmission data (Step S31). When no transmission data is generated (NO at Step S31), the wireless terminal 100 keeps monitoring the generation of transmission data (Step S31).

On the other hand, when it is determined that transmission data has been generated (YES at Step S31), the wireless terminal 100 determines whether or not the amount of the transmission data (the packet count of the transmission data) is larger than a predetermined value (Step S32). The predetermined value used herein is the product (packet count) of the maximum data value (maximum packet count) transmittable in each connection interval and the value of the instant (information about the number of the connection intervals required to elapse between a change of the connection interval and the actual application of a changed connection interval) stored in the storage 30. The predetermined value may be an addition of a certain value (certain packet count) to the product (packet count) of the maximum data value (maximum packet count) transmittable in each connection interval and the value of the instant stored in the storage 30.

When it is determined that the amount of the transmission data is larger than the predetermined value (YES at Step S32), the wireless terminal 100 performs a process for changing the connection interval from HIGH (1 second) to LOW (50 milliseconds) (Step S33). As the process for changing the connection interval from HIGH (1 second) to LOW (50 milliseconds), the wireless terminal 100 transmits an update request to the wireless terminal 100a at Step S12 of FIG. 3. The wireless terminal 100 makes the update request include a connection interval value (50 milliseconds) after a change, or information indicating a decrease (LOW) in the connection interval from a current connection interval value, as information about a connection interval to be changed.

On the other hand, when it is determined that the amount of the transmission data is equal to or smaller than the predetermined value (NO at Step S32), the wireless terminal 100 monitors the next generation of the transmission data (Step S31).

On the other hand, in a determination flow before the execution of a process for changing a connection interval (from HIGH to LOW) by the wireless terminal 100a (slave), just as in the case of the wireless terminal 100 described above, the wireless terminal 100a determines whether or not to change a connection interval from HIGH to LOW according to Steps S31 to S33. In Step S33, the process for changing the connection interval from HIGH to LOW is different between the wireless terminal 100a and the wireless terminal 100. As the process for changing the connection interval from HIGH to LOW, the wireless terminal 100a transmits a change request to the wireless terminal 100 at Step S11 of FIG. 3. The wireless terminal 100a makes the change request include a connection interval value (50 milliseconds), which corresponds to LOW, after a change, or information indicating that the connection interval is decreased (LOW) from a current connection interval value, as information about a connection interval that the wireless terminal 100a requests to change.

According to the determination process of the wireless terminal 100 (100a) described with reference to FIG. 5, when data communication (transmission data) is not generated, the wireless terminal 100 (100a) maintains the connection interval at HIGH (1 second) in order to reduce the frequency of transmission of empty packets, thus allowing a reduction in power consumption required for the transmission of the empty packets. On the other hand, when transmission data larger than a predetermined value is generated, the wireless terminal 100 (100a) changes the connection interval from HIGH (1 second) to LOW (50 milliseconds). Therefore, changing the connection interval, in a state where data transmission is actually continued, allows reducing time required to complete the data transmission.

Figure 6:
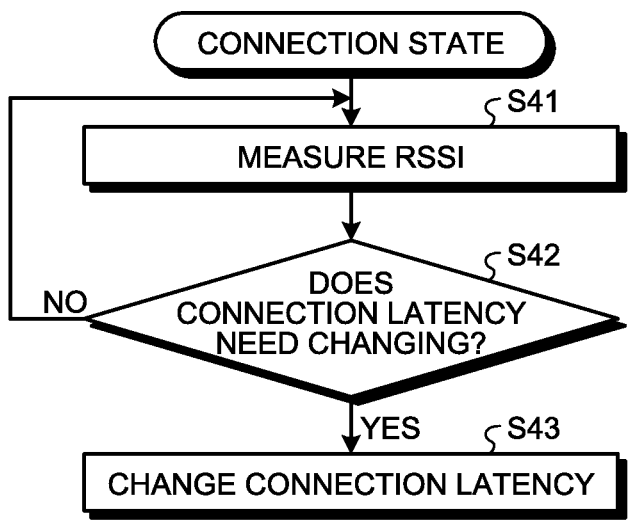
FIG. 6 is a drawing of a determination flow before the execution of a process for changing a sequential non-communication allowable number (connection latency) by the wireless terminal 100 (100a) according to a second embodiment of the present invention.

Then, a determination flow before the execution of a process for changing a sequential non-communication allowable number (connection latency) by the wireless terminal 100 (100a) according to a second embodiment of the present invention will be described with reference to FIG. 6.

A determination flow before the execution of a process for changing a sequential non-communication allowable number by the wireless terminal 100 (master) will next be described.

In the connection state (BLE connection state) in Step S3 of FIG. 2 or 3, the wireless terminal 100 (master) measures the strength (RSSI: received signal strength) of a signal based on data (empty packets) transmitted from the wireless terminal 100a (Step S41). The measurement of the RSSI may be performed periodically or temporarily as required by an application or the like.

The wireless terminal 100 determines whether or not the sequential non-communication allowable number (connection latency) needs changing in accordance with a measurement result (measurement value) of the RSSI (Step S42). To be more specific, the wireless terminal 100 determines which category, out of the categories high, middle, and low, the value of the RSSI measured at Step S41 belongs to, on the basis of the list stored in the storage 30. When a sequential non-communication allowable number corresponding to the determined category is different from the currently set sequential non-communication allowable number, the wireless terminal 100 determines that the sequential non-communication allowable number needs changing. Taking a case where it is determined that a measured RSSI corresponds to the category high as an example, since a currently set sequential non-communication allowable number "4" is different from a sequential non-communication allowable number "0" associated with the category high of the RSSI in the list, the wireless terminal 100 determines that the sequential non-communication allowable number needs changing. In the list, the range (−30 to −40) of the value of the RSSI, instead of the category of the RSSI, may be associated with a connection maintenance period.

When it is determined that the sequential non-communication allowable number needs changing (YES at Step S42), the wireless terminal 100 performs a process for changing the sequential non-communication allowable number (Step S43). The process for changing the sequential non-communication allowable number denotes the transmission of an update request, which includes the value of the sequential non-communication allowable number after a change, at Step S12 of FIG. 3.

On the other hand, when it is determined that the sequential non-communication allowable number does not need changing (NO at Step S42), the wireless terminal 100 keeps measuring the RSSI of a signal from the wireless terminal 100a (Step S41).

On the other hand, in a determination flow before the execution of a process for changing a sequential non-communication allowable number by the wireless terminal 100a (slave), just as in the case of the wireless terminal 100 described above, the wireless terminal 100a determines whether or not the sequential non-communication allowable number needs changing according to Steps S41 to S43. In Step S43, the process for changing the sequential non-communication allowable number is different between the wireless terminal 100a and the wireless terminal 100. As the process for changing the sequential non-communication allowable number, the wireless terminal 100a transmits a change request to the wireless terminal 100 at Step S11 of FIG. 3. The wireless terminal 100a makes change request include the value (0, 2, or 4) of a sequential non-communication allowable number after a change, as information about a sequential non-communication allowable number that the wireless terminal 100a requests to change.

By the determination process of the wireless terminal 100 (100a) described with reference to FIG. 6, the wireless terminal 100 (100a) can change the sequential non-communication allowable number in accordance with the magnitude (distance) of the strength of a receiving electric field of a signal from another wireless terminal in a connection state, thus allowing maintaining the connection state as long as possible.

As a first modification of the first embodiment and the second embodiment, while performing the process for changing the connection interval (from LOW to HIGH/from HIGH to LOW), the wireless terminal 100 (100a) may also perform the process for changing the sequential non-communication allowable number. To be more specific, while performing the process for changing the connection interval from LOW (50 milliseconds) to HIGH (1 second), the wireless terminal 100 (100a) may perform the process for changing the sequential non-communication allowable number from a current value (4) to a lower value (0). On the other hand, while performing the process for changing the connection interval from HIGH (1 second) to LOW (50 milliseconds), the wireless terminal 100 (100a) may perform the process for changing the sequential non-communication allowable number from a current value (0) to a higher value (4).

According to the above modification, the wireless terminal 100 (100a) increases the sequential non-communication allowable number when the connection interval is shortened, and decreases the sequential non-communication allowable number when the connection interval is elongated. This allows maintaining a connection state for at least a certain period or more, irrespective of the length of the connection interval.

As a second modification of the first embodiment and the second embodiment, when a signal from the wireless terminal 100a (100) has a low RSSI, the wireless terminal 100 (100a) changes the connection interval to HIGH (1 second) and/or the sequential non-communication allowable number to high (4). This increases the possibility of improving a communication environment in the next connection interval, thus serving to establish communication in a favorable communication environment.

The wireless terminal 100 (100a) may apply any of the first embodiment, the second embodiment, and the modifications in an arbitrary manner.

The embodiments of the present invention are described above, but the present invention is not limited to the above embodiments. The effects described in the embodiments of the present invention are just enumeration of the most favorable effects produced by the present invention, and are not limited to those described in the aforementioned embodiments.

The wireless terminal according to the embodiments of the present invention includes at least mobile electronic devices such as mobile phones, mobile computers, digital cameras, portable media players, e-book readers, navigators, and game machines, stationary electronic devices such as communication-specific modules specific to communication functions, desktop computers, and TV receivers, and the like.

The connection interval is not dynamically changed in accordance with the presence or absence of the occurrence of data communication (transmission data).

Accordingly, for example, when a relatively long connection interval (for example, 1 second) is set in each of the wireless communication devices (master and slave), if a large amount of transmission data is generated in any one of the wireless communication devices, it requires much time to complete the transmission and reception of the entire data owing to the intervals of 1 second. On the other hand, for example, when a relatively short connection interval (for example, 50 milliseconds) is set in each of the wireless communication devices (master and slave), even if no transmission data is generated in any of the wireless communication devices, empty packets are transmitted at the intervals of 50 milliseconds, thus causing much power consumption.

The present invention contributes to shortening the completion of data transmission and reception using a BLE protocol, a reduction in power consumption, and the like, by more dynamically changing parameters such as a connection interval and a sequential non-communication allowable number.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A wireless communication device, comprising:
a communication module configured to transmit data to another wireless communication device using a short range wireless communication protocol;
a storage configured to store a timer; and
a controller configured to make the communication module transmit data to the other wireless communication device at predetermined intervals, when the data to be transmitted to the other wireless communication device is generated, in a connection state with the other wireless communication device using the short range wireless communication protocol, wherein
the controller performs a process for changing the predetermined interval in accordance with presence or absence of the generation of the data to be transmitted,
the controller performs the process for changing the predetermined interval, after completing an exchange of communication information required for communication using the short range wireless communication protocol with the other wireless communication device, and
the controller activates the timer after completing the exchange of the communication information, and when the timer has expired, the controller performs the process for changing the predetermined interval.

2. The wireless communication device according to claim 1, wherein the process for changing the predetermined interval is transmitting an update request including information about a connection interval after a change or a change request including information about a connection interval to be changed, to the other wireless communication device.

3. The wireless communication device according to claim 1, wherein when the data to be transmitted is generated before the timer expires, the controller stops or resets the timer.

4. The wireless communication device according to claim 3, wherein upon completing the transmission of the data to be transmitted, the controller restarts or starts the timer.

5. The wireless communication device according to claim 1, wherein a change of the predetermined interval is reducing the predetermined interval to a lower value than before.

6. The wireless communication device according to claim 1, wherein when the data to be transmitted is generated, the controller performs the process for changing the predetermined interval in accordance with an amount of the data to be transmitted.

7. The wireless communication device according to claim 6, wherein when the amount of the data to be transmitted is larger than a predetermined value, the controller performs the process for changing the predetermined interval.

8. The wireless communication device according to claim 7, wherein the predetermined value is equal to or more than a value of a product of a maximum data amount transmittable in each of the predetermined intervals and a number of the connection intervals required to elapse until application of the predetermined interval.

9. The wireless communication device according to claim 7, wherein a change of the predetermined interval is increasing the predetermined interval to a higher value than before.

10. A method of operating a wireless communication device which includes a communication module, a storage and a controller, the method comprising:
transmitting, by the communication module, data to another wireless communication device using a short range wireless communication protocol;
storing, by the storage, a timer;
causing, by the controller, the communication module to transmit data to the other wireless communication device at predetermined intervals, when the data to be transmitted to the other wireless communication device is generated, in a connection state with the other wireless communication device using the short range wireless communication protocol; and
after completing an exchange of communication information required for communication using the short range wireless communication protocol with the other wireless communication device,
activating, by the controller, the timer, and
when the timer has expired, performing, by the controller, a process for changing the predetermined interval in accordance with presence or absence of the generation of the data to be transmitted.

11. A non-transitory computer-readable medium containing a program for causing, when executed by a wireless communication device which includes a communication module, a storage and a controller, the wireless communication device to execute:
transmitting, by the communication module, data to another wireless communication device using a short range wireless communication protocol;
storing, by the storage, a timer;
causing, by the controller, the communication module to transmit data to the other wireless communication device at predetermined intervals, when the data to be transmitted to the other wireless communication device is generated, in a connection state with the other wireless communication device using the short range wireless communication protocol; and
after completing an exchange of communication information required for communication using the short range wireless communication protocol with the other wireless communication device,
activating, by the controller, the timer, and
when the timer has expired, performing, by the controller, a process for changing the predetermined interval in accordance with presence or absence of the generation of the data to be transmitted.

12. A wireless communication device, comprising:
a communication module configured to transmit data to another wireless communication device using a short range wireless communication protocol; and
a controller configured to make the communication module transmit data to the other wireless communication device at predetermined intervals, when the data to be transmitted to the other wireless communication device is generated, in a connection state with the other wireless communication device using the short range wireless communication protocol, wherein
the controller performs a process for changing the predetermined interval in accordance with presence or absence of the generation of the data to be transmitted, and
when the data to be transmitted is generated, the controller performs the process for changing the predetermined interval in accordance with an amount of the data to be transmitted.

13. The wireless communication device according to claim 12, wherein when the amount of the data to be transmitted is larger than a predetermined value, the controller performs the process for changing the predetermined interval.

14. The wireless communication device according to claim 13, wherein the predetermined value is equal to or more than a value of a product of a maximum data amount transmittable in each of the predetermined intervals and a number of the connection intervals required to elapse until application of the predetermined interval.

15. The wireless communication device according to claim 13, wherein a change of the predetermined interval is increasing the predetermined interval to a higher value than before.

16. A method of operating a wireless communication device which includes a communication module and a controller, the method comprising:
transmitting, by the communication module, data to another wireless communication device using a short range wireless communication protocol;
causing, by the controller, the communication module to transmit data to the other wireless communication device at predetermined intervals, when the data to be transmitted to the other wireless communication device is generated, in a connection state with the other wireless communication device using the short range wireless communication protocol; and
performing, by the controller, a process for changing the predetermined interval in accordance with presence or absence of the generation of the data to be transmitted, wherein
when the data to be transmitted is generated, the process for changing the predetermined interval is performed by the controller in accordance with an amount of the data to be transmitted.

17. A non-transitory computer-readable medium containing a program for causing, when executed by a wireless communication device which includes a communication module and a controller, the wireless communication device to execute:
transmitting, by the communication module, data to another wireless communication device using a short range wireless communication protocol;
causing, by the controller, the communication module to transmit data to the other wireless communication device at predetermined intervals, when the data to be transmitted to the other wireless communication device is generated, in a connection state with the other wireless communication device using the short range wireless communication protocol; and
performing, by the controller, a process for changing the predetermined interval in accordance with presence or absence of the generation of the data to be transmitted, wherein
when the data to be transmitted is generated, the process for changing the predetermined interval is performed by the controller in accordance with an amount of the data to be transmitted.

* * * * *